United States Patent
Milillo

(10) Patent No.: US 6,351,792 B1
(45) Date of Patent: Feb. 26, 2002

(54) SELECTIVE REMOTE STORAGE COPY SYSTEM AND METHODS

(75) Inventor: Michael S. Milillo, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/243,085

(22) Filed: Feb. 2, 1999

(51) Int. Cl.$^7$ ................................................ G06F 12/00
(52) U.S. Cl. ....................................................... 711/162
(58) Field of Search ................................. 711/161, 162

(56) References Cited

U.S. PATENT DOCUMENTS

| | | | |
|---|---|---|---|
| 4,467,421 A | * 8/1984 | White | |
| 5,072,378 A | 12/1991 | Manka | 395/575 |
| 5,193,184 A | 3/1993 | Belsan et al. | 395/600 |
| 5,247,638 A | 9/1993 | O'Brien et al. | |
| 5,602,764 A | 2/1997 | Eskandari-Gharnin et al. | |
| 5,615,329 A | 3/1997 | Kern et al. | 395/182.04 |
| 5,644,766 A | * 6/1997 | Coy et al. | 711/161 |
| 5,761,678 A | * 6/1998 | Bendert et al. | 707/204 |
| 5,829,046 A | * 10/1998 | Tzelnic et al. | 711/162 |
| 5,915,264 A | * 6/1999 | White et al. | 711/168 |
| 6,044,444 A | * 3/2000 | Ofek | 711/162 |
| 6,058,462 A | * 5/2000 | West et al. | 711/162 |
| 6,098,155 A | * 8/2000 | Chong, Jr. | 711/138 |
| 6,108,749 A | * 8/2000 | White et al. | 711/112 |
| 6,119,208 A | * 10/2000 | White et al. | 711/162 |

* cited by examiner

Primary Examiner—Matthew Kim
Assistant Examiner—Christian P. Chace
(74) Attorney, Agent, or Firm—Duft, Graziano & Forest; Wayne P. Bailey

(57) ABSTRACT

The invention provides for remote copying, between peer storage systems, with data extent granularity. A compressed data image is read from a first location of a primary storage volume. Metadata, and then the compressed data image, are transferred to a secondary storage volume. The metadata specifies a first location within the primary storage volume and a second location within the secondary storage volume. The compressed track is then stored into a second location of the secondary volume. A host connected to the primary control unit specifies data extents within the primary and secondary volumes. The data extents specify the first and second locations, and more preferably define cylinder information, track information, and start and end addresses. An "Establish Pair" command can be used to specify the data extents. A seed value can be used with the metadata to identify the data image during subsequent decompression of the data image in the secondary storage volume. If count fields are used, the secondary control unit modifies the field to specify the correct cylinder and head number at the location of the secondary extent.

13 Claims, 3 Drawing Sheets

SELECTIVE REMOTE STORAGE COPY SYSTEM AND METHODS

FIELD OF THE INVENTION

The invention relates to data storage, and particularly to remote copy, between peers, with selective control for non-identical duplication between primary and secondary storage volumes.

BACKGROUND OF THE INVENTION

Remote copy is a well-known data back-up process, used for example in duplicating the disk volumes of storage system peers. By way of example, a remote copy of IBM's RAMAC storage system can be made into another RAMAC storage system using remote copy, with synchronization managed by internal intelligence.

Prior art remote copy methods and systems require that the secondary volume be an exact duplicate of the primary volume. If the secondary volume has more cylinders than the primary volume, these additional cylinders are not used. Such systems thus waste storage capacity. This is especially true with respect to application data sets that do not utilize the entire storage volume.

Construction of the virtual volume by using the entire disk volume addressing for prior art remote copy also wastes disk address space. Furthermore, since all writes to a primary volume are reflected in the secondary volume, a performance penalty is realized in implementing both writes before the host is given a device end. Specifically, one cannot currently mix data sets in need of remote copy with data sets that do not, without incurring the write penalty for all data sets.

It is, accordingly, one object of the invention to provide remote copy storage systems and methods without the above-described problems. One specific object of the invention is to provide remote copy between peers and with data extent granularity as opposed to volume granularity. A further object of the invention is to reduce the number of secondary volumes required to implement remote copy, between peers, as compared to the prior art. Yet another object of the invention is to provide flexibility in relocating tracks to secondary volumes during remote copying. These and other objects will become apparent in the description that follows.

SUMMARY OF THE INVENTION

U.S. Pat. Nos. 5,615,329, 5,072,378 and 5,193,184 relate to storage systems, remote data duplex and/or virtual data storage, and provide useful background information for the invention. U.S. Pat. Nos. 5,615,329, 5,072,378 and 5,193,184 are thus herein incorporated by reference.

In one aspect, the invention provides a method of remote copying, between peers, with data extent granularity, including the steps of (a) reading a compressed data image from a first location of a primary storage volume; (b) transferring metadata and then the compressed data image to a secondary storage volume, the metadata specifying a first location within the primary storage volume and a second location within the secondary storage volume; and (c) storing the compressed data image into a second location of the secondary volume.

The method can also include the step of specifying data extents within the primary and secondary volumes through a host connected to the primary storage volume. The data extents in this aspect specify the first and second locations.

In yet another aspect, the method includes the step of specifying data extents with cylinder information, track information, and start and end addresses.

In another aspect, the method has the step of utilizing an Establish Pair command in the step of specifying. The Establish Pair command is known to those skilled in the art as an IBM command standard.

In still another aspect, the method includes the step of transferring a seed value with the metadata to identify the data image during subsequent decompression of the data image in the secondary storage volume.

The invention also provides a remote copy system with data extent granularity such as for use in peer-to-peer storage systems. A primary control unit and a primary storage volume store compressed data from a host; and a secondary control unit and a secondary storage volume store selected data from the primary storage volume into selected locations within the secondary storage volume. The primary control unit assigns metadata to the data and transfers the metadata and then the data to the secondary control unit. The metadata specifies (a) a first location associated with the selected data in the primary storage volume and (b) the selected locations within the secondary storage volume.

In another aspect, the primary control unit has a cache for mapping the compressed data into distributed memory of the primary storage volume.

In still another aspect, the secondary control unit has a cache for mapping the selected data into distributed memory of the secondary storage volume.

The system of the invention can further include a host, connected to the primary control unit, to command the remote copying between the primary and secondary control units. By way of example, the host can be used to specify data extents within the primary and secondary storage volumes. These data extents preferably include cylinder information, track information, and start and end addresses.

In yet another aspect, the primary control unit includes means for specifying a seed value with the metadata to maintain data integrity during subsequent decompression of the selected data.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
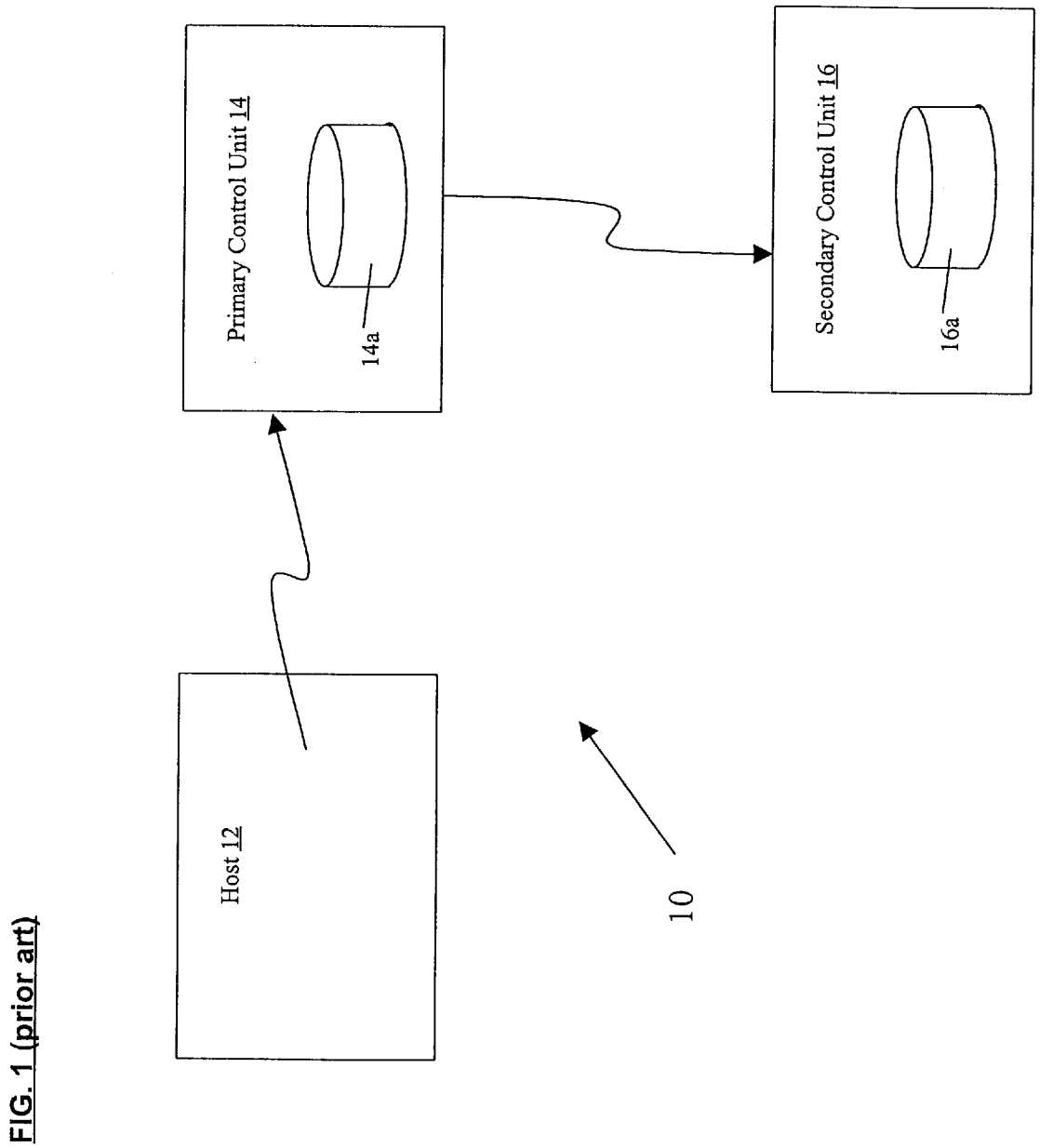
FIG. 1 schematically illustrates operation of prior art peer-to-peer remote copy systems.

FIG. 1 schematically illustrates a prior art remote copy data storage system 10, including a host 12, a primary control unit ("PCU") 14 and a secondary control unit ("SCU") 16. PCU 14 has a virtual volume 14a and SCU 16 has a virtual volume 16a. Virtual volumes 14a, 16a are for example representative of data storage cylinders, known in the art, or complex mappings of distributed memory, such as illustratively shown in FIG. 2. Virtual volumes 14a, 16a can for example be model 3380s or 3390s from IBM.

In operation, host 12 writes to PCU 14 and into virtual volume 14a. With remote copy, PCU 14 thereafter writes to SCU 16 and into virtual volume 16a. Once stored in SCU 16, SCU 16 reports to PCU 14 that the data was received and PCU 14 acknowledges the completed transfer. Host 12 does not interact with, or acknowledge the existence of, SCU 16.

By way of example, host 12 can write to the following address in virtual volume 14a: disk X, cylinder X', track X". With peer-to-peer remote copy, virtual volume 16a receives a very similar mapping-disk Y, cylinder X', track X"—through operation of PCU 14. The only difference between the two resulting volumes 14a, 16a, after storage, is the physical disk or distributed memory. The geometry within the volumes 14a, 16a remains the same.

Figure 2:
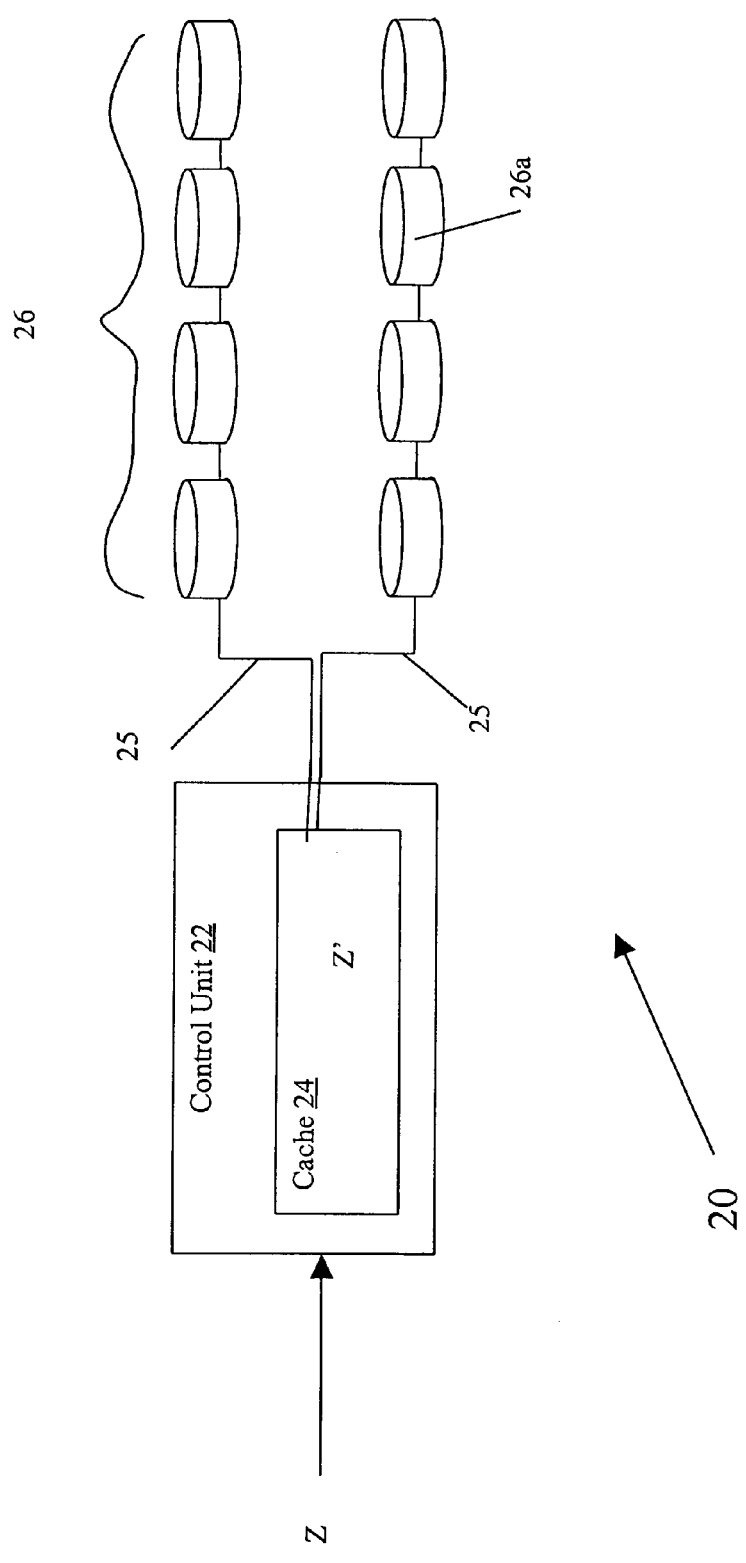
FIG. 2 shows a schematic illustration of one prior art distributed memory arrangement.

FIG. 2 illustrates one prior art distributed memory arrangement 20. Specifically, FIG. 2 shows that a virtual volume (e.g., virtual volume 14a or 16a) within a control unit 22 (e.g., control unit 14 or 16) can be represented as a cache 24 coupled to distributed memory 26. Distributed memory 26 can for example include disks or cylinders 26a with tracks for storage therein. As known in the art, data Z entering control unit 22 is mapped to Z' within the distributed memory 26 via complex mapping detailed at the cache 24. Data bus 25 provides a data routing conduit between the cache 24 and the disks 26a. Those skilled in the art understand that such virtual volumes are commonly designed according to IBM standards.

Figure 3:
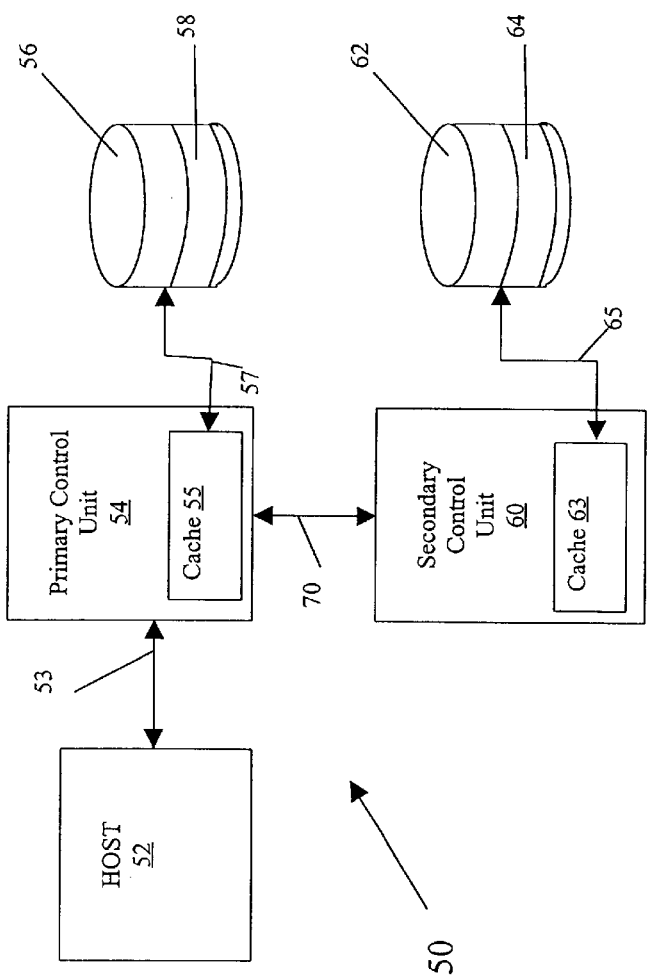
FIG. 3 schematically shows a selective remote copy storage system constructed according to the invention.

FIG. 3 illustrates a selective remote copy storage system 50 constructed according to the invention. A host 52 couples to PCU 54 via data bus 53 for storage capability into primary volume 56. PCU 54 has a cache 55 coupled to volume 56 via data bus 57; and cache 55 maps data into volume 56 according to known methods. Primary volume 56 illustratively shows one track 58 representative of compressed data assuming the primary extent within primary volume 56. Those skilled in the art should appreciate that primary volume 56 can be, and preferably is, a distributed memory arrangement of cylinders and tracks.

System 50 also includes a SCU 60 with a secondary volume 62. SCU 60 includes a cache 63 to map data into secondary volume 62. Data bus 65 couples cache 63 to volume 62. Secondary volume 62 can be, and preferably is, a distributed memory arrangement of cylinders and tracks. By way of example, secondary volume 62 is shown with one illustrative track 64.

As known in the art of virtual volume systems such as Direct Access Storage Devices ("DASD"), each volume 56, 62 can have many disks, cylinders, records and tracks. Each disk can have several cylinders; and each cylinder can have several tracks, each track having storage capacity. Records can fill entire tracks or portions of tracks. Data is spread among tracks and records through the associated cache and according to distributed memory methods known in the art.

With further reference to FIG. 3, PCU 54 transfers data from primary volume 56 to SCU 60 in the form of a compressed track cache image. By way of example, PCU 54 reads the primary extent of track 58 as a compressed track image; and that image is transferred to SCU 60 via data bus 70. In the transfer process, PCU 54 precedes the image transfer with metadata that self-defines the track, making the compressed track invariant with its currently assigned location on a virtual volume. SCU 60 thereafter writes the compressed track to a new location—e.g., at track 64-within secondary volume 62.

Figure 4:
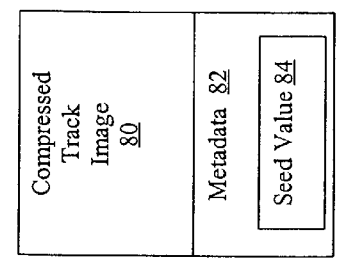
FIG. 4 illustrates data transferred between primary and secondary control units in the form of a compressed track image preceded by metadata, in accord with the invention.

FIG. 4 illustrates data extent 80 and metadata 82 transferred to SCU 60 in the above process. In that process, data extent 80 is preceded by metadata 82, including a seed value 84. Whenever a compressed track 80 is decompressed, seed value 84 is provided in the decompression process as an identification tag for data extent 80. After the compressed track is written to a new location—e.g., track 64 of secondary volume 62—the identification tag remains valid across the relocation even during the decompression process.

Metadata 82 provides for relocation of tracks of the primary volume 56 to different tracks on the secondary volume 62. Data extents within primary volume 56 are reflected and relocated to a different location (if desired) within secondary volume 62 as a copy through commands from the host. By way of example, data extents from the primary and secondary volumes 56, 62 can be made within the Establish Pair command, known in the art remote copy data storage systems.

Accordingly, through host commands, remote copy between peers can now specify data extent granularity. In the prior art, only volume granularity was possible. The invention thus has advantages that include the reduction of required secondary volume capacity and the selectivity in data placement to a user-defined compatible volume.

By way of a specific example, suppose the Establish Pair command from the host specifies X[1,10], X[11,20], Z[1,10] and y[21,30], y[81,90], y[91,100] as the data extents for the primary and secondary volumes, respectively. Each extent specifies the range of cylinders on the disk volume, the tracks, and the start and end addresses. The content of the tracks does not change; but the location is mapped through host commands, making the remote copy volume independent. More particularly, the entire volume need not be copied from the primary volume to the secondary volume, in accord with the invention. Rather, only those portions specified by command are copied; and the user can also specify and manage the location of the secondary data extent within the secondary volume.

In one embodiment, the invention utilizes the count field (known in the art), which specifies information such as cylinder, head and record numbers. In multivirtual storage ("MVS") environments, the count field can be specified to identify the origination of each record. In accord with this embodiment, the SCU modifies the count field, as appropriate, to specify the secondary data extent as cylinder and head numbers for the redirected track in each count field. Accordingly, the host can specify the mapping such as through the Establish Pair command; but the SCU translates the data extents and modifies the count field based upon what is transferred to the SCU by the PCU. For example, if the count field describes the cylinder and head numbers of the primary extent within the primary volume, the SCU moves the data into the secondary extent and modifies the cylinder and head numbers, if needed, based upon the appropriate mapping.

This is significantly different from prior art systems which simply make a one-to-one copy of the data extents, and count fields, into secondary memory. Those skilled in the art should appreciate that certain systems do not utilize the count field and that other identifiers can be used to locate the origination of the primary data extent.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A method of remote copying, between peers, with data extent granularity, comprising the steps of:

reading a compressed data image from a first location of a primary storage volume;

transferring metadata and then the compressed data image to a secondary storage volume, the metadata specifying a first location within the primary storage volume and a second location within the secondary storage volume; and storing the compressed data image into a second location of the secondary volume.

2. A method according to claim 1, further comprising the step of specifying data extents within the primary and secondary volumes through a host connected to the primary storage volume, the data extents specifying the first and second locations.

3. A method according to claim 2, further comprising the step of specifying data extents including cylinder information, track information, and start and end addresses.

4. A method according to claim 2, further comprising utilizing an Establish Pair command in the step of specifying.

5. A method according to claim 1, further comprising transferring a seed value with the metadata to identify the data image during subsequent decompression of the data image in the secondary storage volume.

6. A method according to claim 1, further comprising the step of modifying a count field to indicate location of the data image in the secondary volume.

7. A remote copy storage system with data extent granularity, comprising:

a primary control unit and a primary storage volume for storing compressed data from a host; and a secondary control unit and a secondary storage volume for storing selected data from the primary storage volume into selected locations within the secondary storage volume, the primary control unit assigning metadata to the data and transferring the metadata and then the data to the secondary control unit, the metadata specifying (a) a first location associated with the selected data in the primary storage volume and (b) the selected locations within the secondary storage volume.

8. A system according to claim 7, wherein the primary control unit comprises a cache for mapping the compressed data into distributed memory of the primary storage volume.

9. A system according to claim 7, wherein the secondary control unit comprises a cache for mapping the selected data into distributed memory of the secondary storage volume.

10. A system according to claim 7, further comprising a host, connected to the primary control unit, for commanding peer-to-peer remote copying between the primary and secondary control units.

11. A system according to claim 10, wherein the host comprises means for specifying data extents within the primary and secondary storage volumes.

12. A system according to claim 11, wherein the data extents include cylinder information, track information, and start and end addresses.

13. A system according to claim 7, wherein the primary control unit comprises means for specifying a seed value with the metadata to maintain data integrity during subsequent decompression of the selected data.

* * * * *